United States Patent

[11] 3,607,099

[72] Inventors Emil A. Scordato
Bronxville;
John J. Hartnett, Bronx, both of N.Y.;
Robert J. Varca, Palisade, N.J.
[21] Appl. No. 806,120
[22] Filed Mar. 11, 1969
[45] Patented Sept. 21, 1971
[73] Assignee Medical Laboratory Automation, Inc.

[54] PROTHROMBIN TIME MEASURING APPARATUS
10 Claims, 19 Drawing Figs.
[52] U.S. Cl. .................................................... 23/259,
23/230 B, 23/253, 73/64.1, 356/39
[51] Int. Cl. ....................................................... G01n 33/16
[50] Field of Search ........................................... 23/259,
253, 230 B; 73/64.1; 356/39

[56] References Cited
UNITED STATES PATENTS
3,302,452 2/1967 Leslie ........................... 73/64.1

Primary Examiner—Morris O. Wolk
Assistant Examiner—R. M. Reese
Attorney—William P. Keegan ABSTRACT: A prothrombin time measuring apparatus having a turntable that moves a plurality of plasma-containing test tubes successively to a testing station where a photosensitive device responds to a change in optical density of the plasma and a reagent mixed therewith at the testing station. Refrigerating means keep the plasma at a low temperature until the plasma is to be tested whereupon heating means increase the temperature to normal blood temperature.

PATENTED SEP 21 1971

INVENTORS
EMIL A. SCORDATO
JOHN J. HARTNETT
ROBERT J. VARCA

William L. Hogan
ATTORNEY

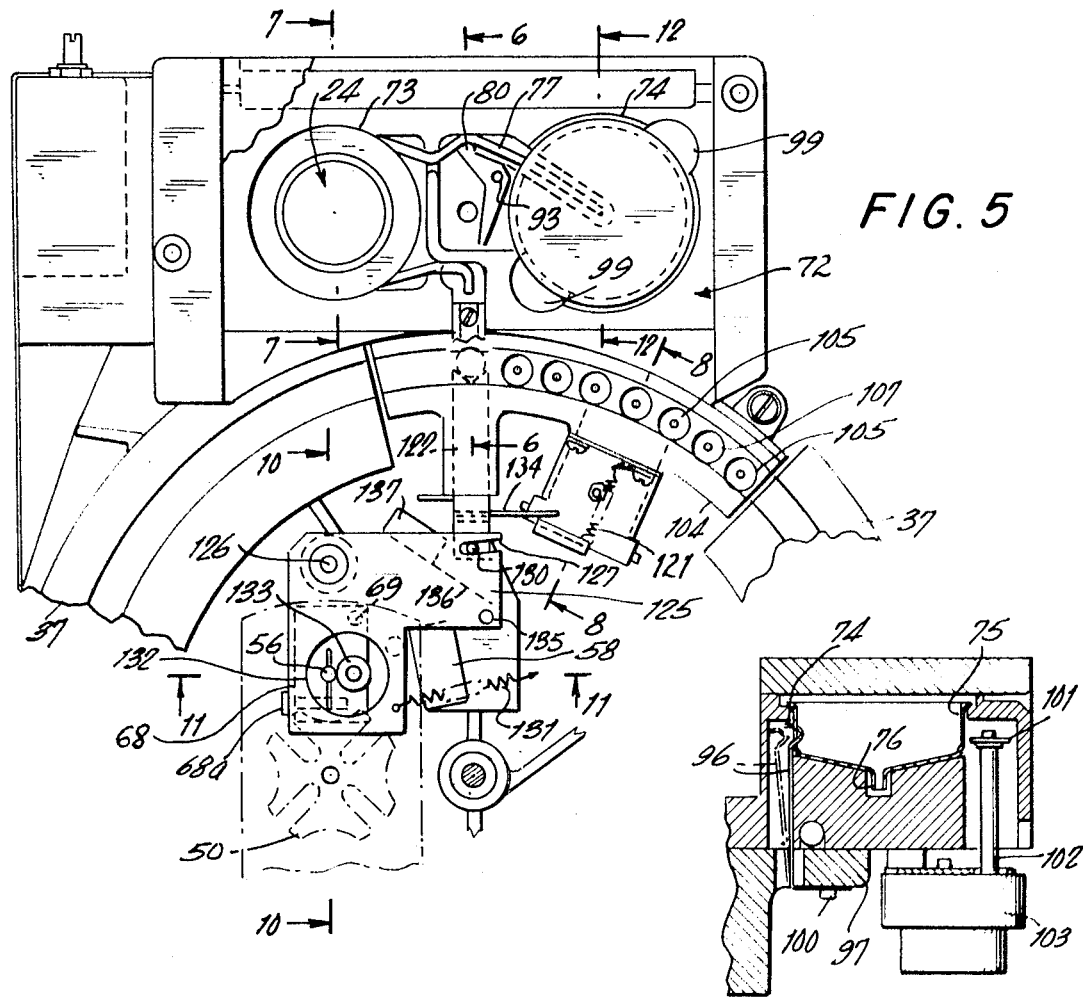
FIG. 5
FIG. 12
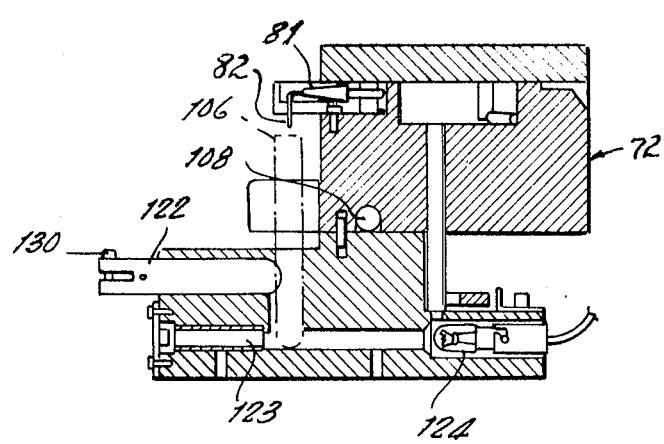
FIG. 6

INVENTORS
EMIL A. SCORDATO
JOHN J. HARTNETT
ROBERT J. VARCA

William P. Hogan
ATTORNEY

INVENTORS
EMIL A. SCORDATO
JOHN J. HARTNETT
ROBERT J. VARCA

William P. Keegan
ATTORNEY

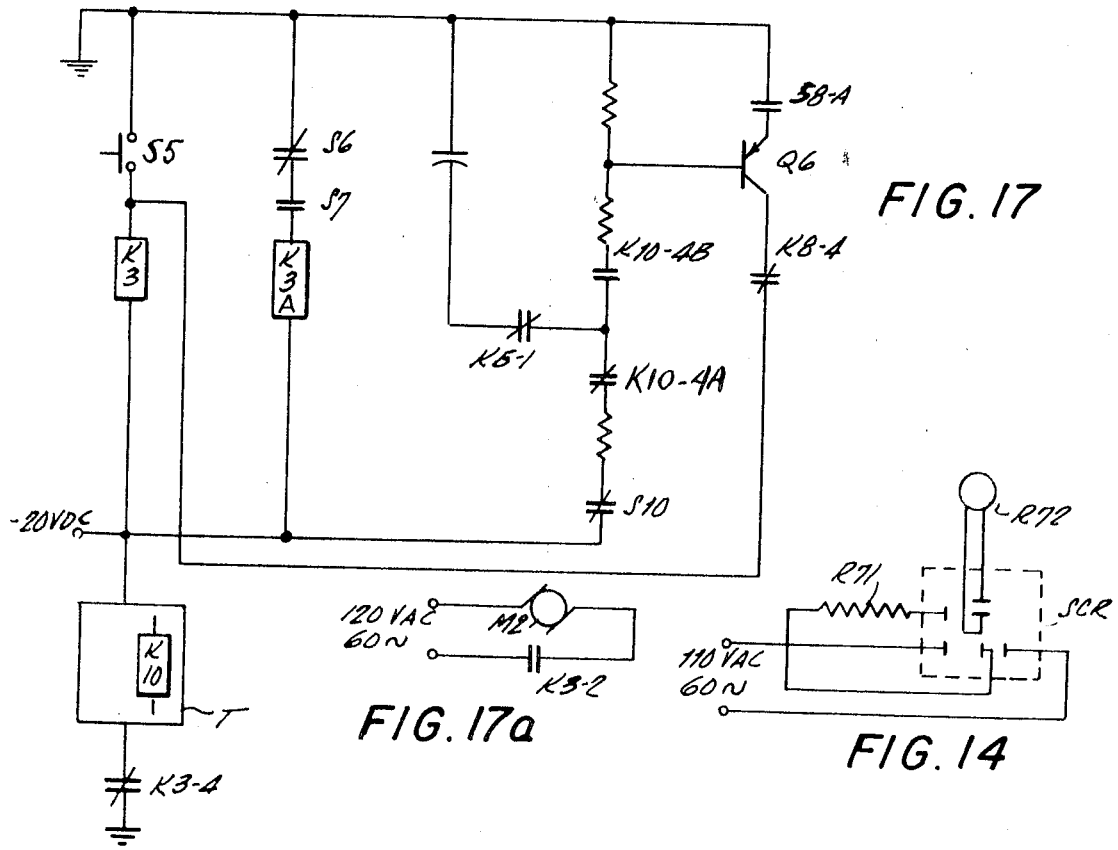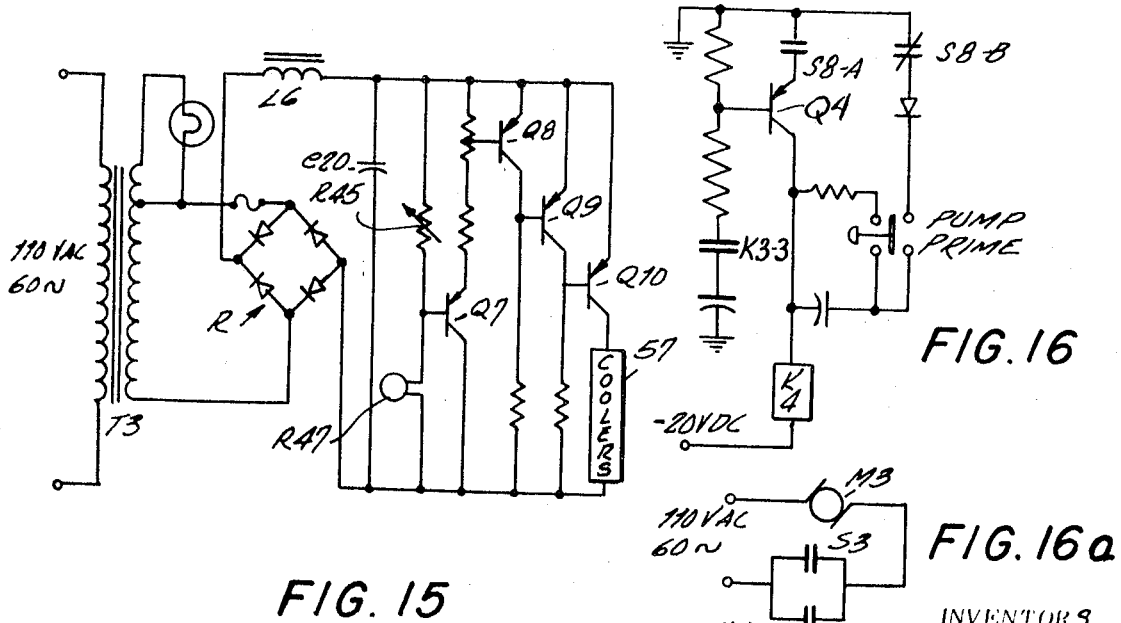

3,607,099

PROTHROMBIN TIME MEASURING APPARATUS

This invention to a prothrombin time recorder apparatus, and particularly to one in which a measured quantity of thromboplastin solution or other reagent is injected into a sample of blood plasma and the endpoint time of the clotting process determined by photometric techniques and automatically recorded.

The present invention contemplates an apparatus for accomplishing the ends above set forth by practicing the method disclosed and claimed in copending application Ser. No. 451,885 filed Apr. 29 1965 , now Pat. No. 3,458,287 which is assigned to the assignee of the present application.

In the method referred to, a sample of blood plasma, into which a prescribed amount of thromboplastin plus calcium chloride solution is mixed, is placed before a light source and the change in optical density of the plasma-thromboplastin solution resulting from the clotting of the mixture is measured by a photoelectric cell. The second derivative of the optical density-time signal is obtained and at the appropriate time, i.e., the point of inflection of the optical density signal, the endpoint of the prothrombin time is recorded.

To assure the accuracy of the prothrombin times obtained with an apparatus of the type here involved, and accurate results are essential since the measured endpoint times may be used to control anticoagulant therapy of thrombotic patients, the apparatus must be capable of maintaining the plasma samples at a predetermined refrigerated temperature and thereafter raising the temperature to the testing temperature of 37° C. The thromboplastin solution itself has to be maintained at the testing temperature, and the entire apparatus has to be such as to prevent contamination of one plasma sample by another.

The object of the invention is to provide an apparatus of the type indicated which is capable of automatically measuring seriatum the prothrombin times of a number of plasma samples and recording such times.

In carrying out the invention there is provided a removable turntable having stations for a plurality of test tubes containing plasma samples. The turntable is indexed to carry the test tubes successively from the refrigerated portion of the apparatus to the photometric testing station, which the test tubes enter with the plasma samples contained therein heated to the required temperature of 37° C. As the test tube containing the sample whose clotting time is to be measured is moved into the testing station, a predetermined measure of thromboplastin plus calcium chloride or other reagent is injected into the test tube with sufficient force to insure adequate mixing of the reagent and plasma. A timer is actuated and the time to the start of the clotting process is measured and recorded after which the turntable is indexed and the next sample of plasma brought to the testing station.

Features and advantages of the invention may be gained from the foregoing and from the description of a p referred embodiment of the invention which follows. In the drawings:

FIG. 5 is a top plan view essentially of the pump, reagent reservoir, and heating block of the apparatus;

FIG. 6 is a sectional view showing the photoelectric components of the apparatus and is taken along line 6—6 of FIG. 5;

FIG. 12 is a sectional view of the reagent reservoir taken along line 12—12 of FIG. 5;

FIG. 14 is a simplified electrical schematic diagram of the heating circuit for the apparatus;

FIG. 15 is a simplified electrical schematic diagram of the cooling circuit for the apparatus;

FIGS. 16 and 16a are simplified electrical schematic diagrams of the pump circuit for the apparatus; and FIGS. 17 and 17a are simplified electrical schematic diagrams of the turntable-indexing circuit for the apparatus.

Figure 1:
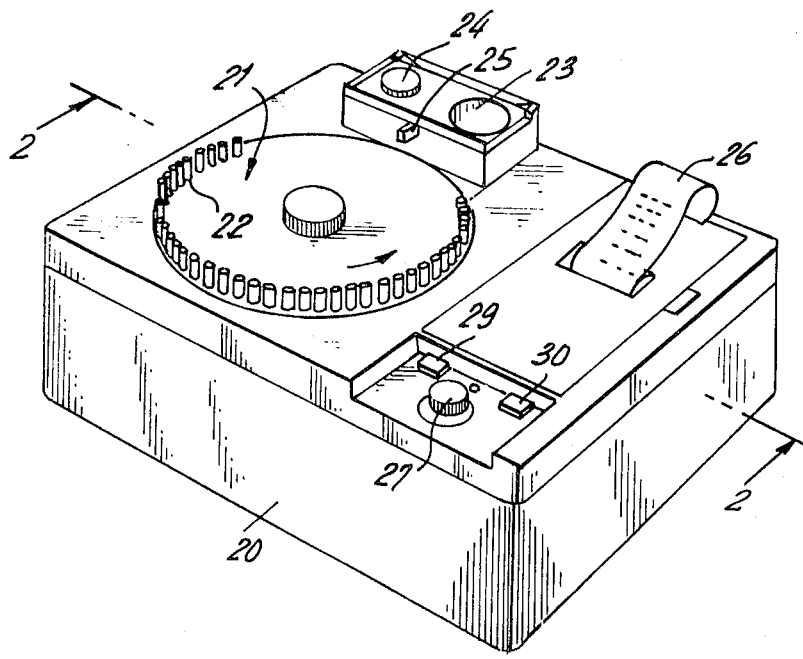
FIG. 1 is a perspective view of the prothrombin time apparatus of the present invention.

Reference is first made to FIG. 1 in which a prothrombin time measuring apparatus embodying the present invention is shown in perspective. Broadly speaking, the apparatus includes a housing or enclosure 20 within which all of the operating elements and electronic circuitry are provided. A rotatable turntable 21 is provided with a plurality, e.g., fifty in a specific embodiment that has been built, of spaced apertures 22 near its periphery. These apertures serve as holders to move test tubes containing plasma samples to be tested to the prothrombin time measuring station. As will be described hereinafter, the test tubes are not supported by turntable 21 but rather by a supporting trough located below the turntable.

A reservoir 23 for the reagent to be used in the test is provided as is a pump 24 for introducing the reagent into the plasma samples. The reagent that can be used is a mixture of thromboplastin and calcium chloride. Other reagents may be used but when the term reagent is used in the present specification it will be understood to mean thromboplastin plus calcium chloride. The pump is of the peristaltic type and it causes a predetermined amount of reagent to be injected into each plasma sample as the latter are advanced under a nozzle held in fitting 25.

The prothrombin time measured for each plasma sample is printed out onto a web or tape 26 that is loaded in the printing head of the apparatus. The prothrombin time measured in seconds and tenths of a second are printed on the web alongside an identifying number for the associated plasma sample. A control knob 27, power on-off switch 29 and starting button 30 are also mounted on the top surface of the enclosure 20.

Figure 2:
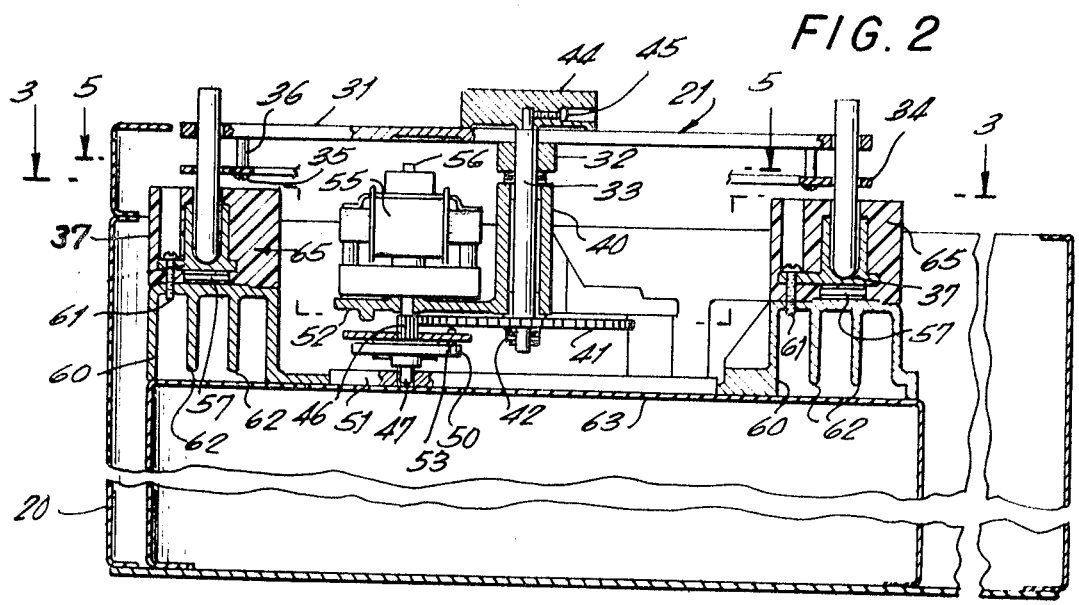
FIG. 2 is a sectional view taken along line 2—2 of FIG. 1.
Figure 11:
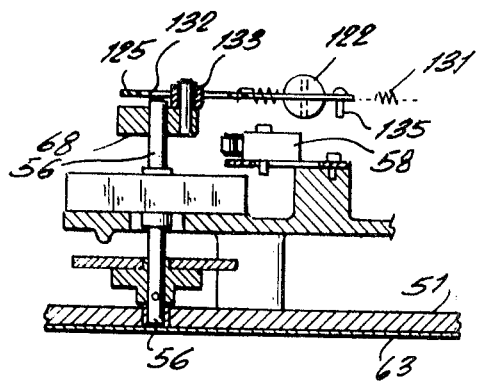
FIG. 11 is a detailed view taken along line 11—11 of FIG. 5.
Figure 3:
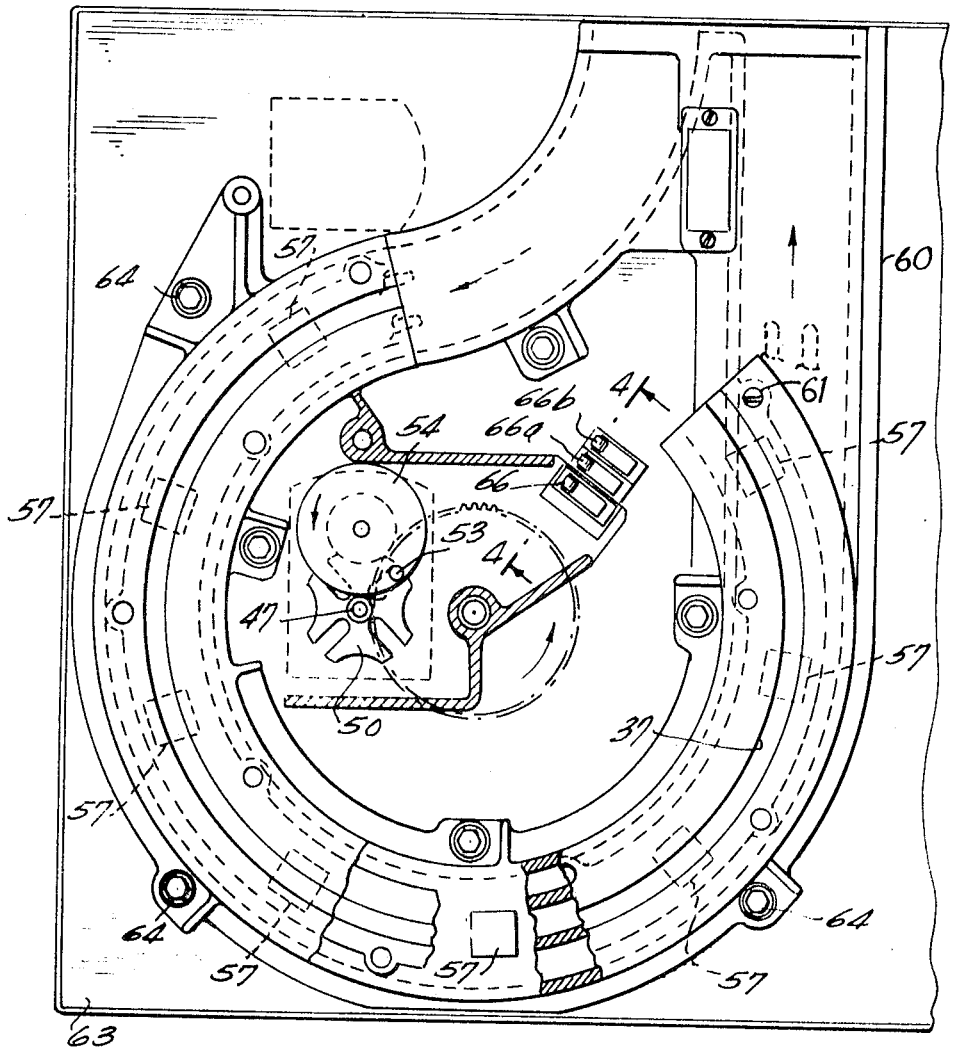
FIG. 3 is a top plan view partly in section and with parts removed taken along line 3—3 of FIG. 2.

The turntable 21 is seen (FIG. 2) to be made up of the apertured disk 31 and an annular ring 34 having apertures aligned with those of disk 31 fastened to the underside thereof by a number of screws 35 spaced around the ring. The screws pass through spacer members 36 which separate ring 34 from disk 31. The purpose of the ring is to keep the plasma-containing test tubes in a vertical position as they are moved towards the prothrombin time measuring station. As clearly shown in FIG. 2 the test tubes are supported, not by the turntable, but by a trough 37 along which they are propelled by the turntable. See also FIG. 3.

Figure 10:
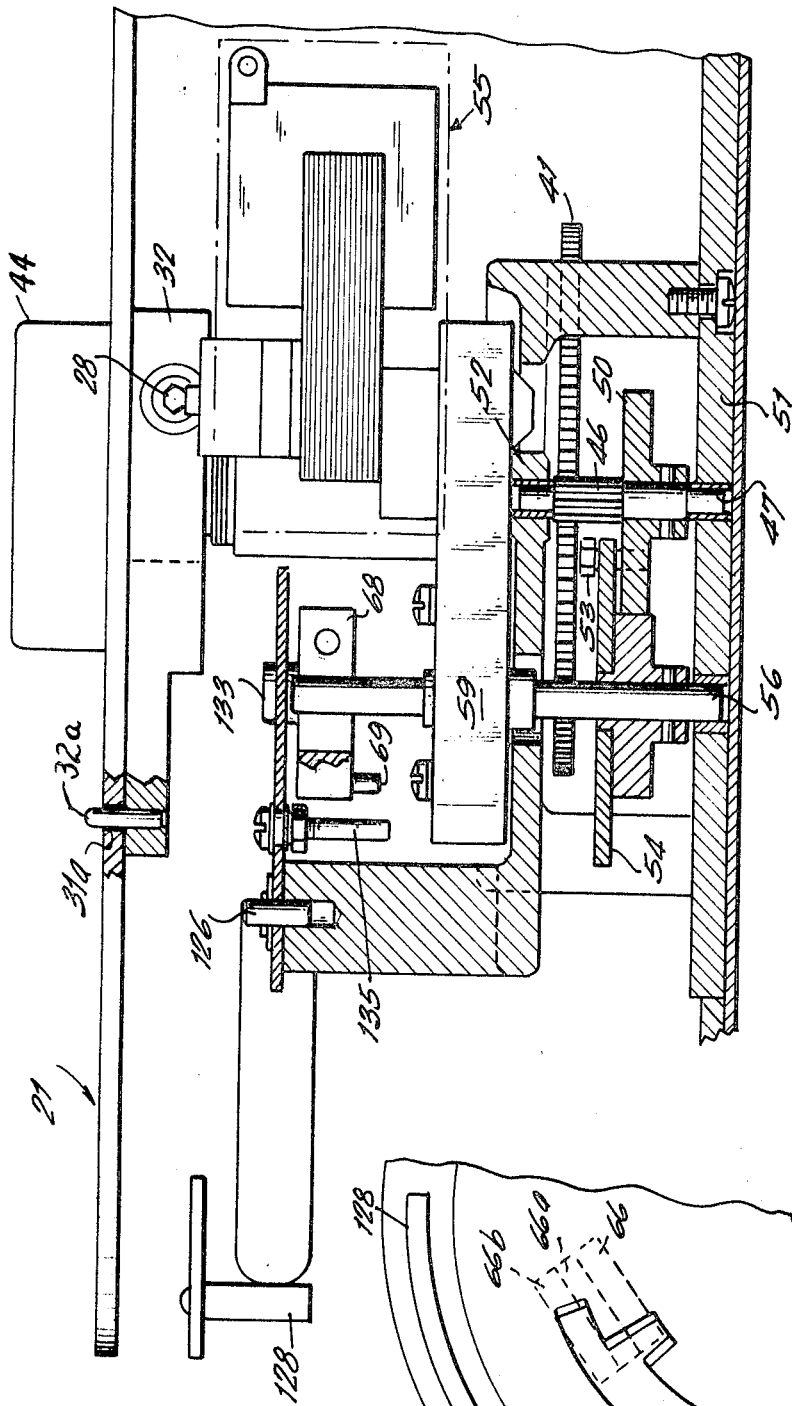
FIG. 10 is a side elevation partly in section of the indexing mechanism of the apparatus.

An oblong block 32 having an aperture therein is fitted over a vertical spindle 33 and clamped to the spindle by a screw 28 that passes through the bifurcated end of the block. A pin 32a wedge fitted at one end of the block, passes through an aperture 31a in disk 31. See FIG. 10. Thus, as spindle 33 is rotated, the turntable 21 is rotated.

The spindle 33 to which disk 31 is secured passes through a vertical bushing 40 and at its lower end carries a relatively large diameter gear 41. The gear is pinned to the spindle so that both turn together. A pin 42 is provided for this purpose.

A thrust bearing 43 is placed between bushing 40 and block 32 so that the turntable rotates freely on the bushing. A knob 44 is secured to spindle 33 by an Allen screw 45. By loosening screw 45, knob 44 can be removed, thus permitting the turntable itself to be lifted off spindle 33 and pin 32a and removed to give access to the internals of the apparatus.

Gear 41 is engaged by a pinion 46 mounted on the same shaft 47 as the sprocket 50 of a geneva movement. The shaft 47 is journaled in the base member 51 and the flange 52 formed on bushing 40. The sprocket 50 is driven by a pin 53 depending from a disk 54 fastened to shaft 56 and which is rotated by an electric torque motor 55 mounted to the rear of shaft 47. This is clearly shown in FIG. 10. Motor 55 drives shaft 56 through a gearbox 59 so that each time motor 55 is energized disk 54 makes one complete revolution and sprocket 50 is advanced one-quarter of a turn. Because of the gear ratio between pinion 46 and gear 41 the turntable is advanced only one station. That is, the turntable is advanced enough only to bring the next sample-containing test tube to the prothrombin time measuring station. A switch 58 is positioned to be actuated by the drive mechanism each time the turntable is advanced one position. The mechanism for actuating the switch includes a split end block 68 clamped to shaft 56 by a screw 68a. A pin 69 depending from one corner of the block strikes the roller of switch 58 once for each revolution of shaft 56, i.e., for each step of turntable 21.

Underneath trough 37 and in intimate contact therewith are a plurality of thermocoolers 57. Eight of them are shown in the preferred embodiment (See FIG. 3). Electricity is directed through the thermocoolers in a direction such that they serve as cooling elements. The thermocoolers are also in intimate contact with an arcuate casting 60 that underlies trough 37 and to which the trough is fastened by screws 61. The underside of the casting 60 is provided with deep ribs 62 that are concentric with the shape of the casting. Preferably, trough 37 and casting 60 are of aluminum, although any good heat-conductive material may be used so that heat is conducted away from trough 37 and to the casting 60 which then becomes in effect a heat sink. A fan (not shown) draws external air through an opening in the rear of enclosure 20 into the plenum formed by casting 60 and the deck 63 to which it is secured by bolts 64. The air passes along the underside of the casting 60 in the direction of the arrows shown in FIG. 3, conducting heat from the casting and its ribs 62 out of the apparatus. Urethane foam material 65 or any other suitable insulating material is provided to surround trough 37 to aid in keeping it in a chilled condition. The purpose of the arrangement described is to enable plasma samples to be retained at the recommended storage temperature until such time as they have to be raised to the normal temperature, i.e., body temperature, for testing.

Figure 4:
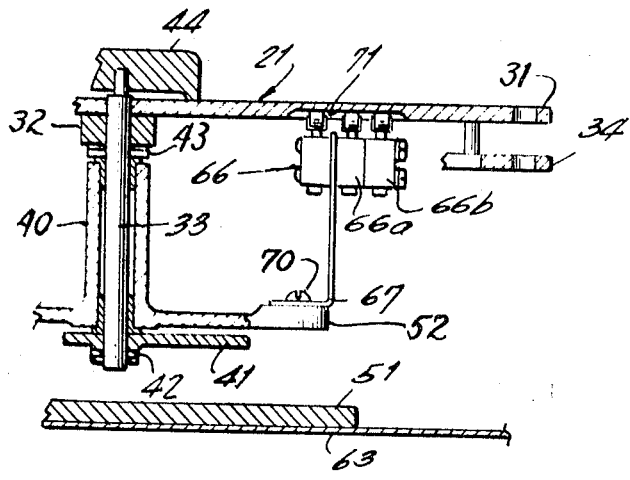
FIG. 4 is a fragmentary sectional view taken along line 4—4 of FIG. 3.

FIG. 4 illustrates a series of mechanically actuated switches 66, 66a, and 66b are supported by an L-shaped bracket 67 that is fastened to flange 52 by a screw 70. The switches are actuated by cam surfaces 71 formed on the underside of disk 31. See also FIG. 13. The purposes of the switches and the cam surfaces will be described hereinafter.

Attention is now directed to FIG. 5 which shows in more detail the reagent reservoir 23 and the peristaltic pump 24 referred to in the description of FIG. 1. The pump block 72 is a machined block of metal, preferably aluminum as are most of the structural components of this apparatus, having two wells or receptacles 73 and 74 formed therein. One of the wells, 74, is provided for the reagent container 75. This container is a relatively shallow dish having an inverted low conically shaped bottom with an outlet drain 76 at its center. The container fits loosely in the well for a reason that will be clear from the later description. A plastic tubing 77 is fitted over drain 76 and threaded past an antisyphon valve 80, and around the circumference of the peristaltic pump 24. Plastics such as polyvinyl chloride or a polyethylene can be used for the tubing so long as they are compatible with the reagent used in the prothrombin time test. A high impact polystyrene is used for container 75.

The operation of peristaltic pumps is well known and need not be described here. The tubing is then wound to the nozzle 81 which includes a downwardly pointing nozzle tip 82. The arrangement is such that the reagent, e.g., thromboplastin plus calcium chloride, can be delivered into a test tube containing a plasma sample with sufficient force to completely mix the reagent and the plasma and so enable the prothrombin time of the plasma to be measured.

Figure 7:
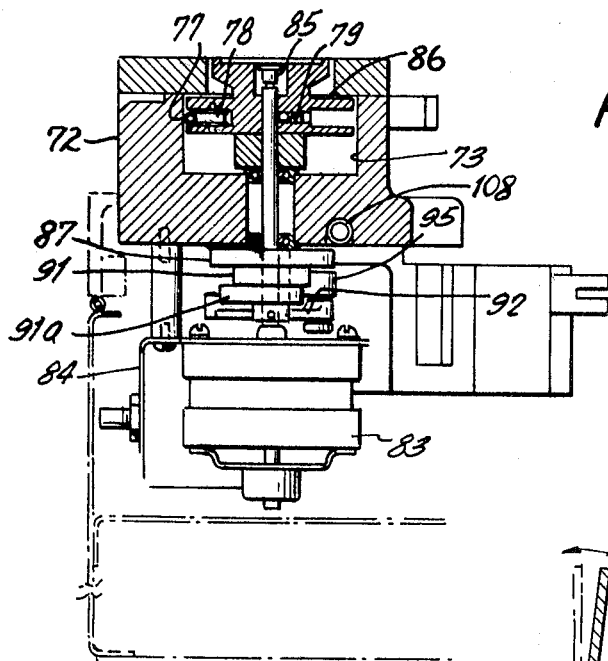
FIG. 7 is a sectional view of the pump mechanism used in the apparatus and is taken along line 7—7 of FIG. 5.

The pump 24 is driven by an electric motor 83 mounted on a bracket 84 located below pump block 72. See FIG. 7. In the present application the motor does not run continuously but rather steps one revolution for each plasma sample to be tested thus delivering a fixed quantity of reagent to each plasma-containing test tube. If a different quantity of reagent is to be delivered for each revolution of the pump, as may be the case when running a different test in the apparatus, tubing 77 of a different internal diameter may be used.

The motor shaft 85 passes through pump block 72 and into well 73 where the pump rotor 86 is slidably connected to it. The arrangement is such that when the tubing from the reservoir 23 is to be changed for any reason, the rotor is pulled up out of its well, the tubing wrapped around it (more specifically around guide rollers 78), and the rotor and tubing slipped back into the well. A detent device 79 comprising a spring-biased ball maintains the rotor in the raised position by urging the ball into an annular groove formed near the upper end of shaft 85.

Motor shaft 85 also has mounted on it a number of cams which perform some of the timing control functions in the apparatus. Cam 87 actuates switch 90, the purpose of which will be hereinafter referred to, and cams 91 and 91a control the movement of arm 92. Arm 92 is clamped to the stub shaft 93 on which antisyphon valve 80 is mounted. A tension spring 94 keeps follower roller 95 in engagement with cams 91 and 91a. Upper cam 91 will control the opening of valve 80 while lower cam 91a will control the closing of the valve. Two cams are provided to control valve 80 so that its operation can be closely regulated by adjusting the positions of the cams on shaft 85. The valve will be open when pump 24 is ejecting reagent into the test tube in the test station, but will be closed when the pump is stopped.

When the reagent container 75 is placed in well 74, a leaf spring 96 bears against one side of the container. See FIG. 12. The leaf spring is bent at its lower end and is secured to block 97 by a screw 100. Thus the container is resiliently held for horizontal movement. Bearing against the opposite side of container 75 is an eccentric or star wheel 101 keyed to the vertical shaft 102. The shaft is rotated continuously through a pair of gears (not shown) by a small motor 103. In this way the container 75 can be continuously agitated when the apparatus is in use to insure that the reagent remains thoroughly mixed. A pair of cutouts 99 are provided in the pump block on opposite sides of the reservoir well 74 to enable an operator to insert his fingers and grasp the reagent container 75 when it is to be removed.

Still referring to FIG. 5, it will be noted that in the last eight positions (including the test station) taken by the plasma-containing test tubes as they approach the test station under nozzle tip 82, the test tubes are in contact with trough 104 which is separated from the cooling trough 37. Now the plasma has to be heated to bring the samples up to a temperature of 37° C. by the time the reagent is squirted into the test tube and the prothrombin time test performed. Thus trough 104 is a heating block and a resistance heater 108 is in intimate contact with the block.

Figure 8:
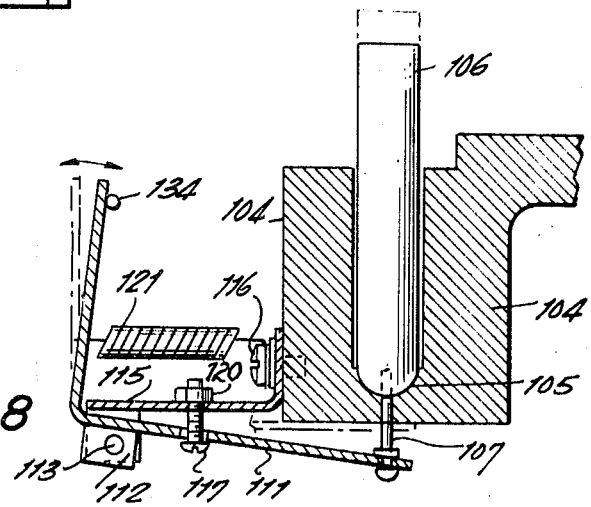
FIG. 8 is a sectional view taken along line 8—8 of FIG. 5.
Figure 9:
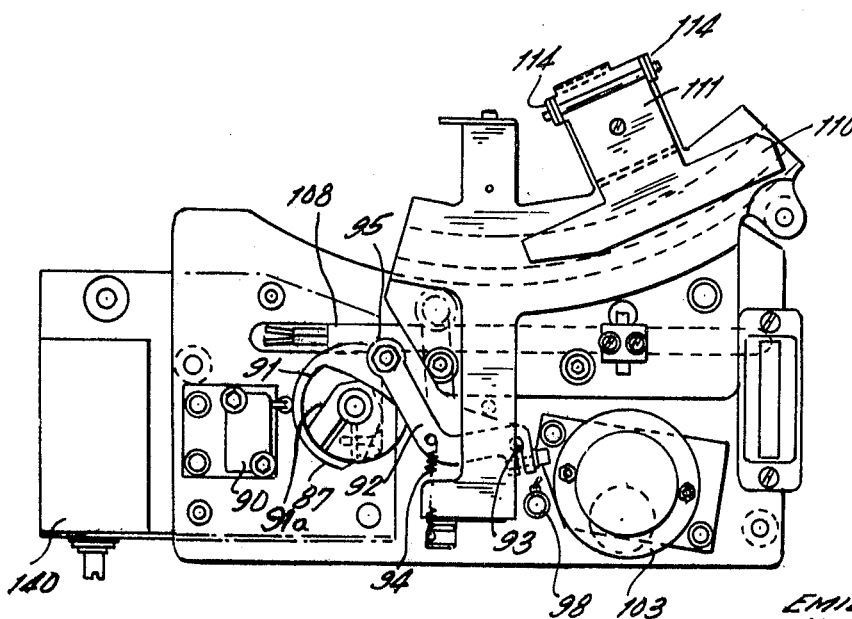
FIG. 9 is a bottom view of the mechanism shown essentially in FIG. 5.

The bottom of trough 104 for the seven positions preceding the test station is not flat but rather is provided with seven hemispherical depressions 105 into which the test tubes fit rather snugly. The reason for this is that the plasma sample occupies only the bottom, or curve portion, of the test tube, and in order to bring it from 8° C. (the temperature of the samples when refrigerated in trough 37) to 37° C. (the temperature to be reached when a sample reaches the test station) in the relatively short time it takes a test tube to be advanced eight stations, the test tube should be in intimate contact with the heating block. In FIG. 8, a test tube 106 is shown in one of the depressions and it is seen that the normal test quantity of plasma, 0.10 ml., occupies only the curved portion of the test tube.

It will be remembered hat the plasma-containing test tubes only slide along the trough 37 and the trough 104, and consequently, means are provided to lift the test tubes out of the depressions 105 when turntable 21 is indexed. Such means include a series of seven vertical pins 107 that pass through apertures drilled in the centers of the depressions 105 through the bottom of the heating block. The pins 107 are mounted on the elongated portion 110 of a pivoting L-shaped bracket 111. The bracket is provided with two depending ears 112 through which a pin 113 passes. The pin is supported by two lugs 114 on bracket 115 which in turn is fastened to heating trough 104 by a pair of screws 116. The clockwise pivoting of bracket 111 is restrained to prevent pins 107 being completely withdrawn from the heating block by a screw 117 and nut 120 place as shown on brackets 111 and 115. A spring 121 normally urges bracket 111 in a clockwise direction, that is, with pins 107 withdrawn. When the turntable is to be indexed, bracket 111 is pivoted counterclockwise (FIG. 8) thus raising the test tubes being heated out of the depressions 105 and permitting them to be advanced to the next position.

Since a relatively small quantity of plasma is provided in each test tube, it is desirable to position the test tube rather accurately in the testing station. This is accomplished by the mechanism shown in FIG. 5. A notched plunger 122 bears against the test tube and holds it securely to the wall of the apparatus and in alignment with the photocell 123 and the lamp 124 (FIG. 6) that provide the electrical signal used in the prothrombin time determination.

The plunger 122 is moved towards and away from the test tube by a member 125 that is pivotally mounted on pin 126. An elongated slot 127 in the member coacts with a pin 130 provided on plunger 122 so that when member 125 is urged counterclockwise by a tension spring 131, plunger 122 is advanced towards the test tube and when the member is pivoted clockwise he plunger is withdrawn. Of course, the plunger is withdrawn when the turntable 21 is indexed an advanced preparatory to a prothrombin time determination.

Member 125 is provided with a relatively large circular aperture 132 within which a cam follower roller 133 travels. The roller 133 is rotatably mounted on block 68. Thus, as block 68 rotates, as it does when turntable 21 is indexed one position, member 125 is pivoted clockwise and then counterclockwise as roller 133 engages the periphery of aperture 132. The movement of member 125 reciprocates plunger 122 as before mentioned, and the movement of the plunger results in the pivoting of bracket 111 through the intermediary of pin 134 which projects from plunger 122. Member 125 also carries a depending screw 135 that engages the lever arm 136 of switch 137. As will be noted later, switch 137 is actuated only if plunger 122 is advanced to indicate the absence of a test tube in the test station.

In operation, the turntable will be loaded with a number of test tubes each containing 0.10 ml. of a plasma sample to be tested. The test tubes will have been stored under refrigerated conditions with the plasma at 8° C. The apparatus will be connected to an AC power source and the apparatus switched on.

The cooling trough 37 is maintained at the same 8° C. temperature by the thermocoolers 57 so that there will be no deterioration of the plasma samples while they are in the apparatus awaiting test of the prothrombin time. It is to be noted that when the turntable is loaded only the apertures located above the cooling trough 37 will be filled. In other words, those apertures over heating block 104 are empty. If it is assumed that the turntable has a regular starting position, that portion of disk 31 initially positioned over the heating block need not be provided with apertures at all. Thus, the apparatus will index through eight cycles before the first plasma-containing test tube reaches the test station. During this period, the plasma temperature will be raised from 8° to 37° C.

The cooling circuit is shown in FIG. 15. The line AC voltage is stepped down to 18 v. by transformer T3, and converted to filtered DC by full wave rectifier R, inductor L6, and capacitor C20. Current to the thermocoolers 57 is controlled by a transistor Q10 which in turn is controlled by the temperature sensor R47 and the transistor amplifier comprising transistors Q7, Q8, and Q9 and their associated resistors. The temperature sensor is a solid-state-type thermistor. Resistor R45 permits adjustment of the set point temperature between 5° C. and room temperature.

The heating circuit, FIG. 14, for heating trough 104 includes a 120 volt 200 watt standard resistance-type electrical heater R71 (108). A solid-state thermistor R72 (98) buried deep inside the pumpblock 72 controls the heater R71 by means of a temperature-controlling module SCR (140). The module is a proportional-controlling type that adjusts the effective current through heater R71 by adjusting the firing angle of a silicon control rectifier circuit.

A reagent, such as thromboplastin plus calcium chloride, is heated before it is put in container 75, and then because the container is held in the same block that is heated by heater R71, it is maintained at the same 37° temperature that the plasma samples are brought to for testing. Motor 103, of course, runs continuously to keep the reagent well mixed.

Figure 13:
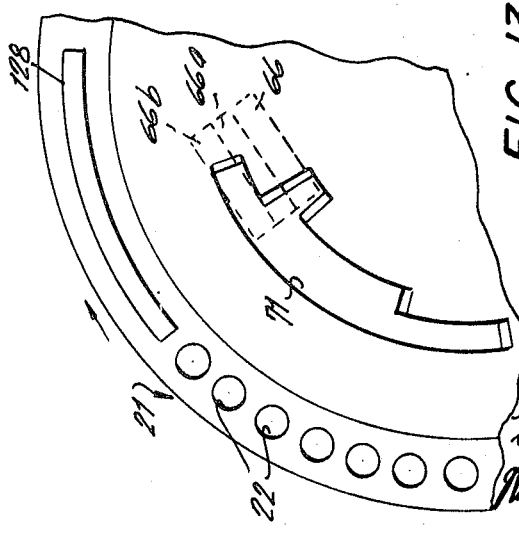
FIG. 13 is a fragmentary bottom view of the turntable showing particularly cam surfaces that determine the operation of several control switches of the apparatus.

Motor M2 (55) is the index or turntable drive motor, and as before described, it rotates the turntable counterclockwise one station at a time. It will be assumed that the apparatus is at rest with the turntable at the home position, i.e., with seven blank stations between the first test tube-containing plasma to be tested and the test station. This is shown in FIG. 13 where switches 66 and 66a will be operated. Switch 66 will only be operated when the turntable is in its home position.

To start the apparatus, the starting pushbutton S5 (30) is pressed to energize latching coil K3 and thereby engage contacts K3–2. Engagement of contacts K3–2 energizes motor M2 (55) to rotate the turntable one station and bring the first test tube to the first heating position (called T–7) seven positions before the testing station. At T–7 the test tube plunger 122 strikes the cam 128 and prevents member 125 from pivoting far enough counterclockwise to open switch S6 (137). As previously observed, cam 128 is effective only until the first test tube is advanced to the test station. At the same time switch S7 (58) is closed momentarily by the geneva mechanism, more specifically by pin 69 in block 68. The coincidental closure of S6 and S7 energizes coil K3a which unlatches the relay K3 and results in contacts K3–2 separating to deenergize the turntable drive motor M2 and thus stop the turntable.

When the K3 relay unlatches, contacts K3–4 engage to start the 25-second timer T. At the completion of the 25-second time interval, relay K10 is energized and contacts K10–4A separate while contacts K10–4B engage. Transistor Q6 is turned on and relay K3 is again latched to engage contacts K3–2 thereby energizing motor M2 and again advancing the turntable one station. Again cam 128 impedes the stroke of plunger 122 causing the cycle described to be repeated. The cycle is repeated seven times altogether, and then on the eighth cycle the first test tube reaches the test station. During the initial seven indexing cycles during which no test tube reached the test station, the first test tube and the subsequent ones are being advanced and lowered into the depressions 105 formed in the heating through 104 so that as each test tube reaches the test station the plasma samples contained therein will be at the requisite temperature of 37° C.

At this point of operation of the apparatus, cam 128 no longer is effective and the operation of switch S6 is now governed solely by the presence or absence of a test tube. If a test tube is present, S6 will remain closed and the turntable will stop at that station as above described. On the other hand, the absence of a test tube will allow plunger 122 to move all the way in and member 125 will pivot far enough counterclockwise to open switch S6 and the turntable will continue to rotate past the empty aperture position.

After the turntable passes the initial seven stations, switch S10 (66a) opens. At the completion of the 25-second time interval coil K10 is energized, separating contacts K10–4A and engaging contacts K10–4B. Transistor Q6 will not be turned on until after contacts K5–1 separate and then engage at least once. Relay K5 is operated when the printer prints the results of a clotting test. The turntable will advance one station after 25 seconds or the result of a clotting test is printed, whichever takes longer. Thereafter, clotting tests are repeated in the manner described, one by one, until all the samples have been tested and the apparatus turned off.

Of course, once the test tubes containing the plasma samples reach the test station the reagent has to be injected into the test tube. This is accomplished as follows. Each time the turntable stops with a test tube in the test station, relay K3 unlatches to close contacts K3–3 thereby turning on transistor Q4 momentarily. Relay K4 is in series with Q4 and is, therefore, energized momentarily each time the turntable stops at the test station. The momentary energization of relay K4 engages contacts K4–4 to start pump motor M3 (83). When the motor starts to turn, switch S3 (90) closes and remains closed for one revolution of cam 87. When switch S3 opens motor M3 is deenergized until a new plasma sample is advanced to the test station as hereinabove described.

Having thus described a preferred embodiment of the invention it is to be understood that many changes and variations can be made to the structure and to the circuitry without departing from the spirit and scope of the invention. Therefore, it is intended that the specification and drawing be interpreted as illustrative rather than in a limiting sense.

What is claimed is:

1. An apparatus for measuring the prothrombin time of blood plasma comprising, a turntable for moving test tubes containing plasma to a prothrombin time measuring station, a photosensitive means and a light source, means for indexing said turntable to bring test tubes moved thereby successively between said photosensitive means and said light source, refrigerating means for maintaining plasma samples at a predetermined storage temperature, heating means for bringing a plasma sample to a predetermined test temperature just prior to the prothrombin time determination, a reagent reservoir, pump means for injecting a predetermined amount of reagent into a plasma-containing test tube at the start of the prothrombin time determination, and circuit means responsive to said photosensitive means output for determining the change in the optical density of the plasma-reagent mixture.

2. An apparatus according to claim 1 wherein said heating means includes a heat-conductive block having a plurality of depressions conforming to the shape of the test tubes into which test tubes approaching the testing station are lowered, and including means for raising test tubes out of said depressions so that they can be moved towards the testing station as the turntable is indexed.

3. An apparatus according to claim 1 including means for agitating the reagent reservoir whereby the contents thereof are maintained uniformly mixed.

4. An apparatus according to claim 1 wherein said pump means includes a one cycle peristaltic pump, antisyphon valve means, and cam means mounted on the pump shaft for controlling when the valve means is opened and when the valve means is closed.

5. An apparatus according to claim 1 including a timer mechanism and means for starting said timer mechanism the prothrombin simultaneously pumping the predetermined quantity of a reagent into a plasma sample.

6. An apparatus according to claim 5 wherein the timer mechanism includes a printout device for printing the prothrombin time determined by a test.

7. An apparatus according to claim 1 wherein said indexing means includes means for determining whether or not a test tube is in the prothrombin time measuring station.

8. An apparatus according to claim 7 including means responsive to a determination that there is no test tube present for indexing the turntable to the next position.

9. An apparatus according to claim 1 wherein said refrigerating means includes a generally circular trough in which test tubes containing plasma are moved, said trough being formed of a heat-conductive material, thermocoolers in intimate contact with said trough, and insulating means in contact with the sides of said trough.

10. An apparatus according to claim 9 including a heat sink in contact with the bottom of said trough, and fan means for moving air over said heat sink and out of said apparatus.